UNITED STATES PATENT OFFICE.

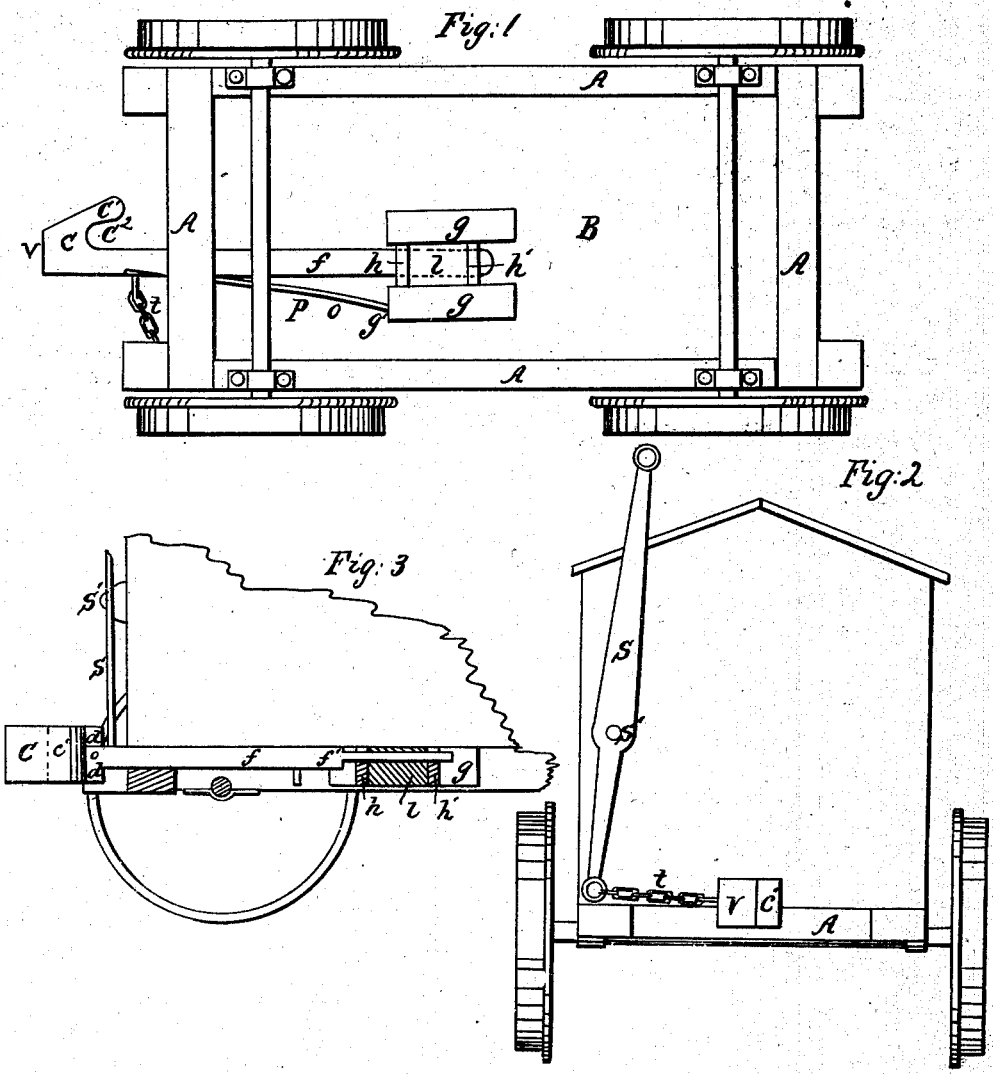

LUTHER ADAMS, OF BLANCHESTER, OHIO.

CAR-COUPLING.

Specification of Letters Patent No. 26,403, dated December 13, 1859.

*To all whom it may concern:*

Be it known that I, LUTHER ADAMS, of Blanchester, in the county of Clinton and State of Ohio, have invented a new and useful Improvement in Car-Couplings; and I do hereby declare that the following is a full and clear description thereof, reference being had to the acocmpanying drawings and to the letters of reference marked thereon and made to form a part of this specification.

The nature of my invention relates first, to the construction and arrangement of latches, by means of which the cars may couple, of themselves as they are made to come together. Second, in combination with the coupling latches, the arrangement of a rubber spring by means of which said latches are made to act as elastic bumpers, as hereinafter set forth.

In reference to the accompanying drawings Figure 1, is a bottom view, Fig. 2 a side view and Fig. 3 an end view of the coupling showing its construction, arrangement, and attachment to cars for use.

(A) represents the truck frame, (B) the bottom of a car.

(C) represents the latch, constructed with an inclined head (C′) in such manner that said head shall be in the form of a catch as is clearly shown in Fig. 1, the head (C′) of the latch is made with shoulders at (d), which are intended to bear against the truck frame, when the coupling is acting as a bumper, and the pressure is beyond the capacity of the springs (l).

(f) is the shank of the latch (C), and is formed to extend a proper distance under the bottom of the car as shown in Fig. 1, to the fastenings (g), between these fastenings (g) is arranged an india rubber spring (l) between the plates (h, h′), the plate (h′) being permanently secured to the fastenings (g) and the plate (h) being movable so as to allow of the compression of the spring (l), the shank (f) is formed with shoulders at (f′) which are intended to bear against the movable plate (h) and thereby secure the elastic action of the spring (l).

(p) is a spring attached to the fastening (g) at (g′) and arranged to press against the shank (f) of the latch, so as to secure perfectly the self coupling of the cars, and at the same time, to allow said latches to be retracted, during the operation of uncoupling the cars.

(s) is a lever pivoted to the car frame at (s′), and connected with the latch, by means of a chain (t), by means of which the latch may be retracted when it may be desired to uncouple the cars. It is intended that one of said levers (s) shall be used in connection with each latch, so that the operator, may remain upon the car which is to be moved after the operation of uncoupling. The inclined face (C′) of the head of the latch will always be made of a length sufficient to secure the perfect operation of the coupling and prevent the outer ends (v) of the latches from striking against each other.

I do not claim broadly the use of catches, as a device for car coupling, neither do I claim the india rubber spring when taken separately, as I am aware that similar devices have been used; but Having described the construction and use of my invention what I claim as my invention and desire to secure by Letters Patent is—

The combination and arrangement of the latch (C, f) spring (l) and plates (h, h′) when constructed and made to operate substantially as described for the purposes set forth.

In testimony of which invention I have hereunto set my hand.

LUTHER ADAMS.

Witnesses:
H. E. CLIFTON,
D. N. B. COFFIN, Jr.